(12) United States Patent
Bergman et al.

(10) Patent No.: US 7,172,502 B1
(45) Date of Patent: Feb. 6, 2007

(54) TOOL-LESS BLADE CHANGE SHOE FOR A SKINNING MACHINE

(75) Inventors: Matthew A. Bergman, Des Moines, IA (US); Kenneth L. Lebsack, Ankeny, IA (US); James L. Myers, Urbandale, IA (US); Matthew P. Sawhill, Des Moines, IA (US); Brent M. Veldkamp, Cumming, IA (US)

(73) Assignee: Stork Townsend Inc., Des Moines, IA (US)

( * ) Notice: Subject to any disclaimer, the term of this patent is extended or adjusted under 35 U.S.C. 154(b) by 0 days.

(21) Appl. No.: 11/160,756

(22) Filed: Jul. 7, 2005

(51) Int. Cl.
*A22C 17/12* (2006.01)

(52) U.S. Cl. .................................................. 452/129

(58) Field of Classification Search ................ 452/125, 452/127, 128, 136; 99/589–591, 588, 485, 99/486, 537–540, 489–492; 30/355, 357, 30/329, 870, 871, 873, 105, 698, 699, 700, 30/856, 915.5

See application file for complete search history.

(56) References Cited

U.S. PATENT DOCUMENTS

| | | | |
|---|---|---|---|
| 3,496,823 A | 2/1970 | Kruse | |
| 3,542,105 A | 11/1970 | Townsend | |
| 3,769,903 A | 11/1973 | Greider et al. | |
| 3,892,010 A | 7/1975 | Bartels et al. | |
| 3,931,665 A | 1/1976 | Townsend | |
| 4,466,344 A | 8/1984 | Schill et al. | |
| 4,606,093 A | 8/1986 | Townsend | |
| 4,730,368 A * | 3/1988 | Townsend | 452/127 |
| 4,793,026 A * | 12/1988 | Braeger et al. | 452/127 |
| 5,211,097 A * | 5/1993 | Grasselli | 83/698.11 |
| 5,288,264 A | 2/1994 | Braeger et al. | |
| 5,494,478 A | 2/1996 | Long | |
| 5,766,066 A * | 6/1998 | Ranniger | 452/127 |
| 6,089,967 A * | 7/2000 | Gugg | 452/127 |
| 6,299,523 B1 * | 10/2001 | Wonderlich et al. | 452/127 |
| 6,357,346 B1 * | 3/2002 | Townsend | 99/589 |
| 2004/0198207 A1 | 10/2004 | Schill | |

FOREIGN PATENT DOCUMENTS

EP   0 445 892 A1   11/1991
WO   WO0/11546 A1   1/2000

* cited by examiner

*Primary Examiner*—Thomas Price

(57) ABSTRACT

A skinning machine having a skinning blade mounted between a clamp and a shoe. The shoe has a bore that extends therethrough and a cam arm mounted to a bottom surface. The clamp has a recess with an aperture disposed therethrough. A pin extends through the aperture of the clamp and the bore of the shoe and is retained by the clamp arm.

6 Claims, 4 Drawing Sheets

TOOL-LESS BLADE CHANGE SHOE FOR A SKINNING MACHINE

BACKGROUND OF THE INVENTION

This invention is directed toward a meat skinning machine and more particularly a meat skinning machine having a blade holder that does not require tools to change the blade and an adjustable pin for clamping a blade between a shoe and a clamp.

Meat skinning machines are well known in the art and generally have a tooth roll that pulls meat toward a cutting blade held in place between a clamp and a shoe to remove the skin or membrane of the meat. The blade, which is made of stainless steel, becomes dull over time and must be replaced. To replace the blade the skinning machine must be disassembled which requires special tools to remove the clamp. Disassembly of the machine is cumbersome and time consuming.

Some attempts have been made to solve this problem. For example, U.S. Pat. No. 5,494,478 teaches a machine where the clamp slides backwards and hooks on a plurality of mushroom-shaped protrusions. This process, however, is not very hygienic. Another machine, disclosed in U.S. Pat. No. 5,211,097 teaches the use of bolts that are fulcrums which hold the blade tightly between the clamp and shoe. The top part of the clamp is pushed forward to release the fulcrum and remove the blade. This, and other machines, however, are not easily loosened to allow the clamp to be removed and the machine cleaned. Nor do these machines maintain the desired clamping pressure when the clamp is replaced or allow for adjustment as the bolts stretch or wear though use. Accordingly, there is a need in the art for an improved skinning machine.

Therefore, a primary objective of the present invention is to provide a skinning machine that is easier to assemble and disassemble.

Another objective of the present invention is to provide a skinning machine that is easier to clean.

A still further objective of the present invention is to provide a skinning machine where it is easy to adjust the clamping pressure.

These and other objectives will be apparent to those skilled in the art from the following claims and written description.

SUMMARY OF THE INVENTION

A skinning machine having a skinning blade mounted between a clamp and a shoe. The shoe has a bore that extends therethrough and a cam arm mounted to a bottom surface. The clamp has a recess with an aperture disposed therethrough. A pin extends through the aperture of the clamp and the bore of the shoe and is retained by a cam arm. In one embodiment the pin is adjustable having a first portion that is threadably connected to a second portion.

BRIEF DESCRIPTION OF THE DRAWINGS AND PHOTOS

DETAILED DESCRIPTION OF THE PREFERRED EMBODIMENT

Figure 1:
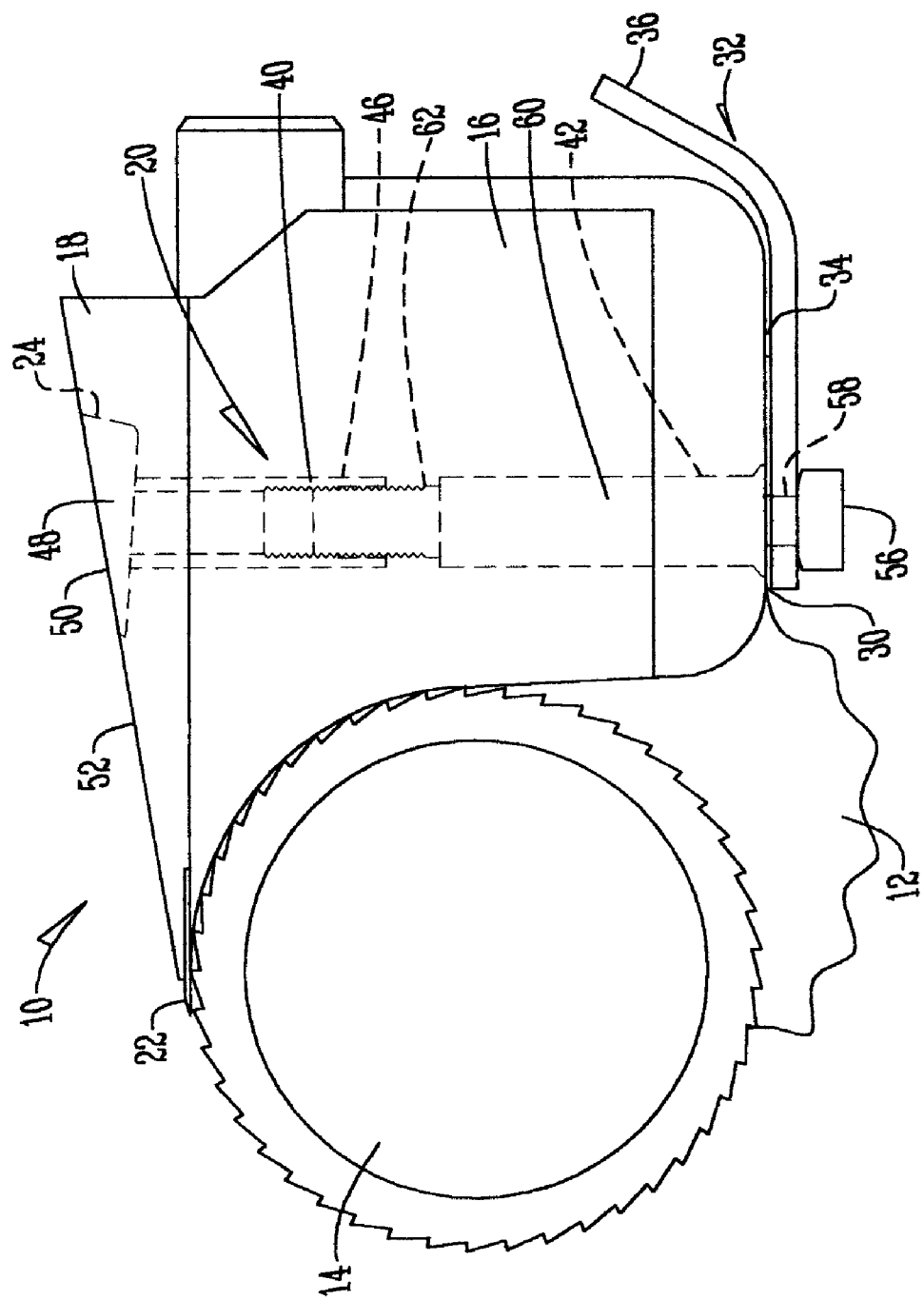
FIG. 1 is a side view of a skinning machine.
Figure 2:
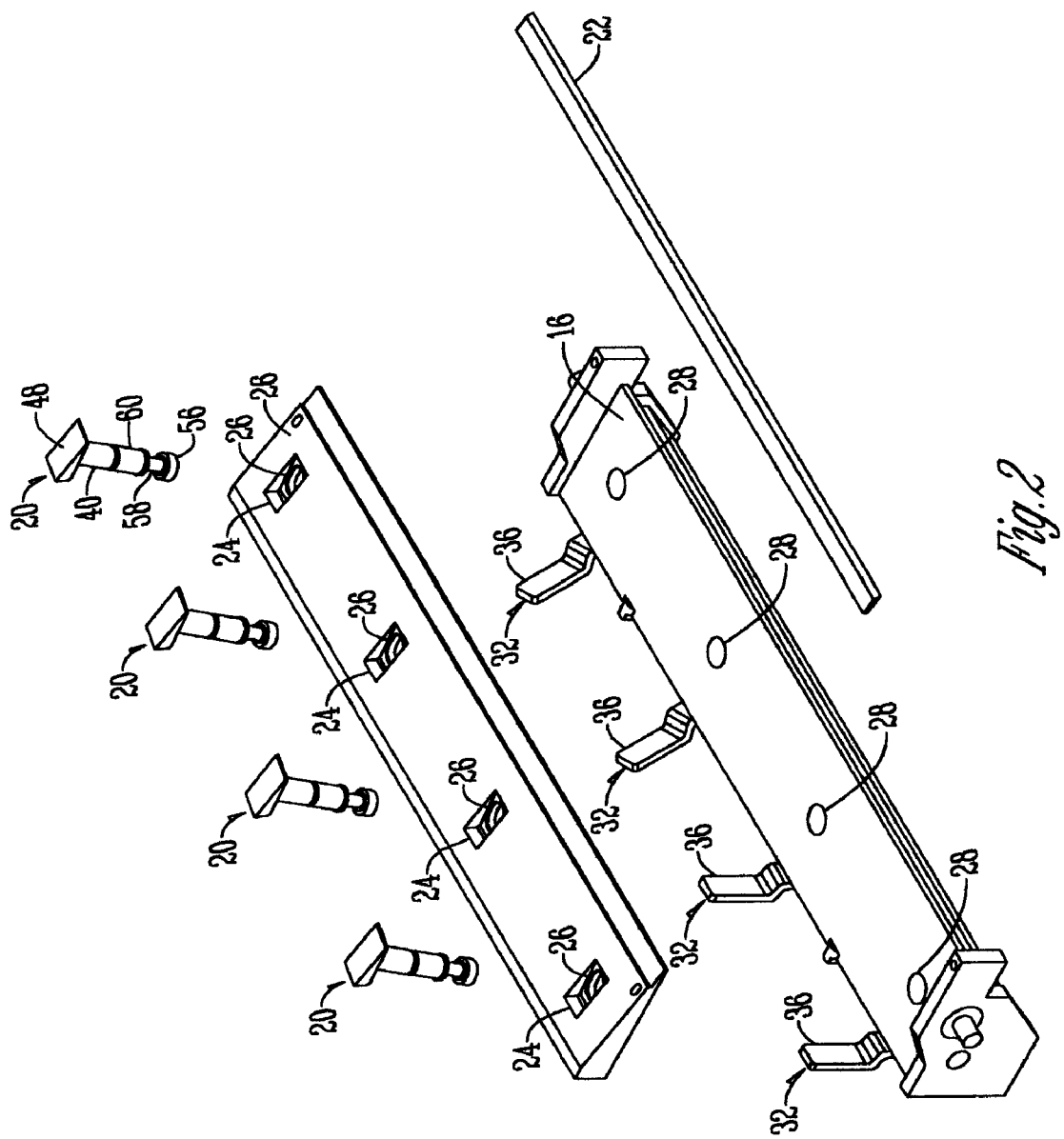
FIG. 2 is an exploded perspective view of a portion of a skinning machine.
Figure 3:
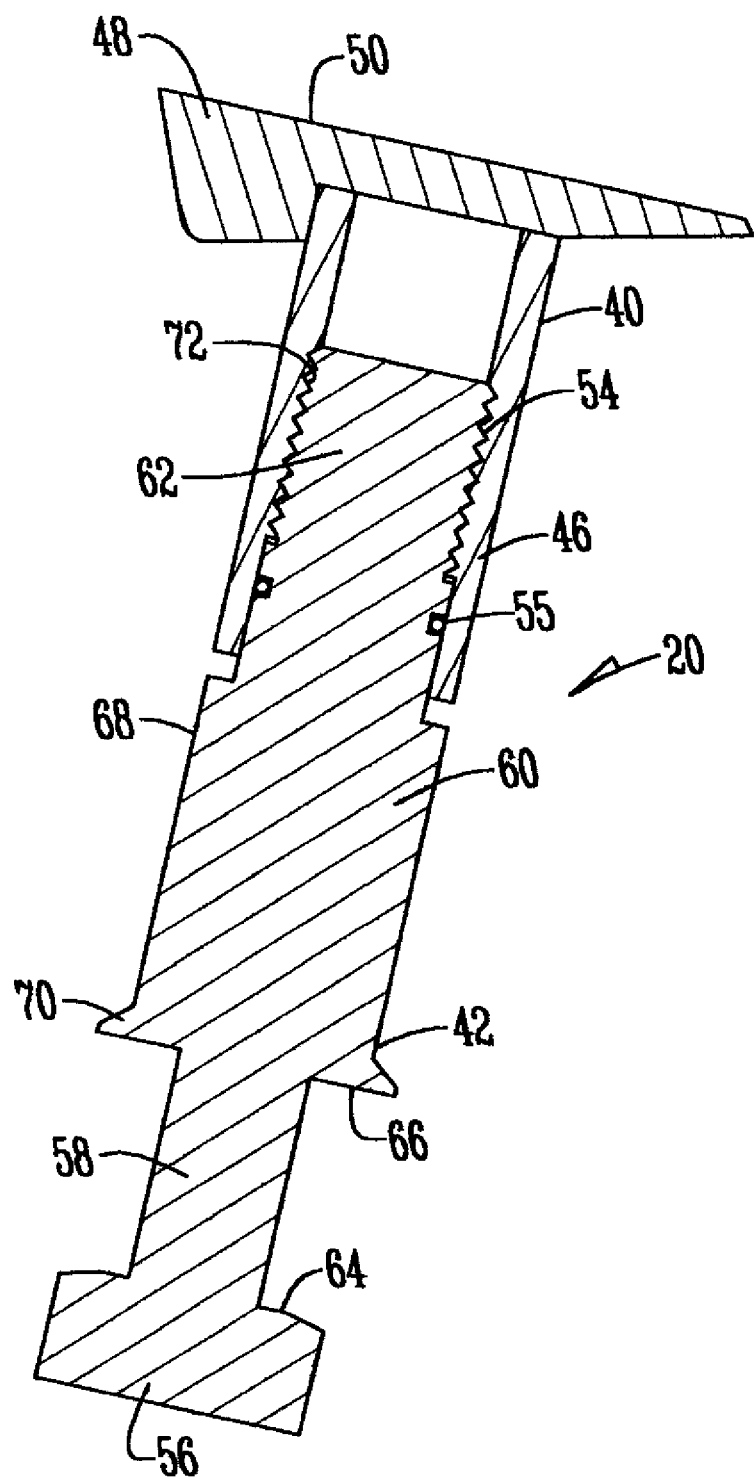
FIG. 3 is a sectional side view of an adjustable clamping pin.
Figure 4:
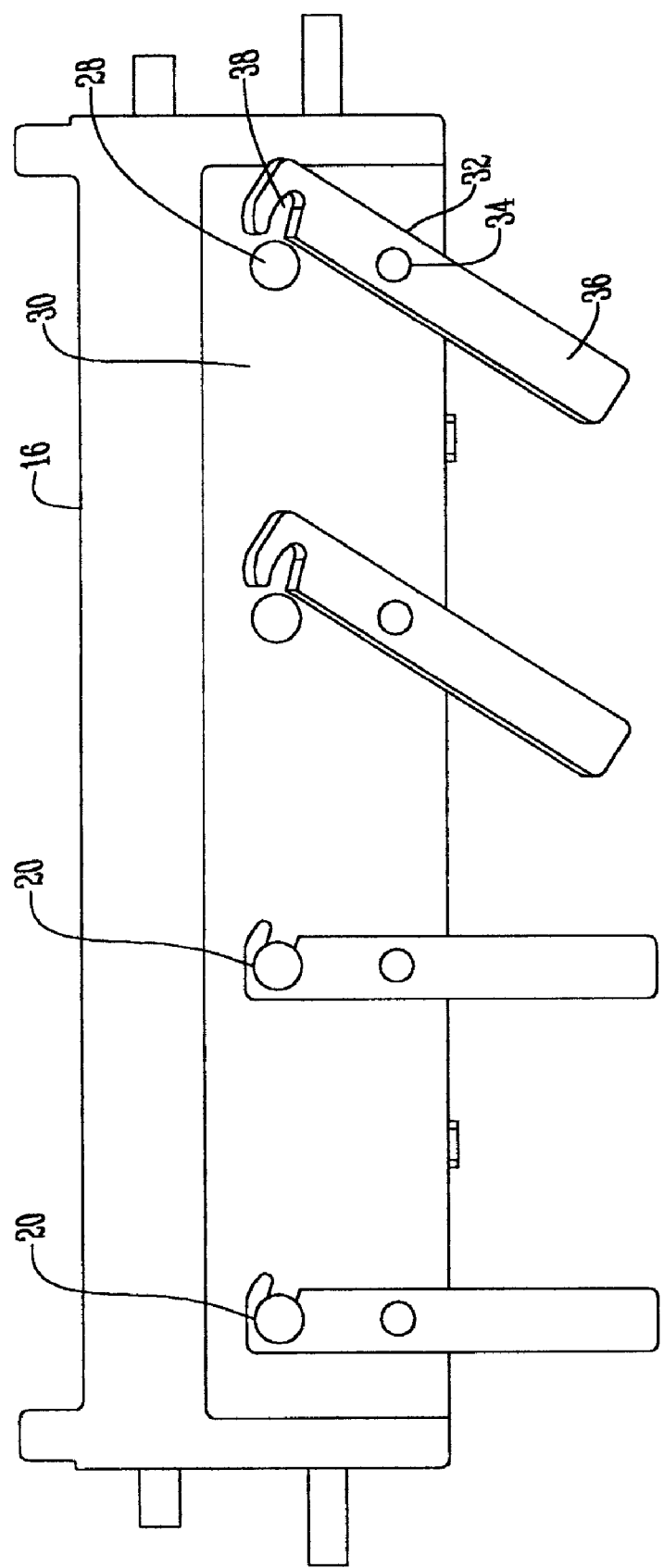
FIG. 4 is a bottom plan view of a shoe of a skinning machine.

With reference to the Figures, a skinning machine 10 has a frame 12 and an elongated gripper or tooth roll 14. The tooth roll is rotatably mounted on the frame 12. A shoe 16 partially embraces the tooth roll 14. A clamp 18 is secured to the shoe 16 with a plurality of adjustable pins 20 to clamp an elongated cutting blade 22 between the clamp 18 and the shoe 16 closely adjacent the peripheral outer surface of the tooth roll 14.

The clamp 18 has a plurality of recesses 24 with each recess having a centrally located aperture 26. The shoe 16 has a plurality of bores 28 that extend through the shoe 16, the bores 28 being in alignment with the apertures 26 of the clamp 18. Mounted on a bottom surface 30 of the shoe 16 are a plurality of cam arms 32 that pivot about a pin 34. The cam arms 32 have a gripping portion 36 at one end and a cam slot 38 at the opposite end.

The adjustable pins 20 extend through aperture 26 of clamp 18 and bore 28 of the shoe and are retained within the cam slot 38 of the cam arm 32 to exert clamping force upon blade 22. The pins 20 have a first or upper body portion 40 and a second or lower body portion 42. The first portion 40 has a downwardly extending hollow member 46. The first portion 40 is attached in any conventional manner to a base 48. The base 48 has a diameter that is greater than the diameter of the aperture 26 of the clamp 18. The base 48 preferably is of a triangular shape such that a top surface 50 of the base lies flush with the top surface 52 of the clamp when the pin is installed. The hollow member 46 has a diameter less than the diameter of aperture 26 and bore 28. The hollow member 46 also has threads 54 on its internal surface. In one embodiment the hollow member 46 is also engaged by a seal 55 that is disposed through the lower body portion 42.

The second portion 42 preferably has a retaining head 56, a first section 58, a second section 60, and a third section 62. The retaining head 56 extends out of the bore 28 of the shoe 16 and has a width greater than the cam slot 38. The first section 58 extends outwardly from the retaining head 56 and has a diameter that is less than the diameter of the retaining head 56 to form a first retaining shoulder 64. The first section 58 has a width less than the width of cam slot 38. The first section 58 terminates in the second section 60 which has a diameter greater than the first section 58 to create a second retaining shoulder 66. The second section 60 has a squared portion 68 and a cylindrical ridge 70. The squared portion has a diameter less than the diameter of bore 28 and aperture 26 while the ridge 70 has a diameter less than the bore 28, but greater than the aperture 26 of the clamp 18.

The second section 60 terminates in a third section 62 that extends outwardly and has a diameter less than the second section 60. The third section 62 also has a diameter less than the hollow member 46 and has external threads 72 that threadably mate with internal threads 54 of the hollow member 46. One skilled in the art will appreciate that the internal and external threads may be reversed such that the first portion 40 is received within a hollow section of the second portion 42.

In operation, to clamp the blade into place, first portion 40 of pin 20 is inserted through aperture 26 of clamp 18 and is threadably mated to the second portion 42 of pin 20 that extends through bore 28 of shoe 16 such that retaining head 56 and at least a portion of first section 58 extend beyond the bottom surface 30 of the shoe 16. The cam arms 32 are then rotated about pins 34 by applying force to the gripping portion 36 such that the first section 58 is received within cam slot 38. The cam arm 32 acting upon the first shoulder 64 of the retaining head 56 provides the clamping force to hold blade 22 in place between the shoe 16 and the clamp 18.

To disassemble the machine 10, the cam arm 32 is rotated in the opposite direction such that first section 58 is no longer received within cam slot 38. At this point the clamp 18 can be removed from the machine 10 for cleaning or adjustment of the pins. Because both the base 48 and the ridge 70 have a diameter greater than the diameter of aperture 26, the pins are retained by the clamp so they do not fall out and become lost. If the pins 20 are not adjusted, the clamp 18 is reassembled and the clamping force is maintained.

To adjust the pins 20 either because of application of use or wear, the first portion 40 is threadably rotated toward or away from the second portion 42. The base 48 and the squared portion 68 provide gripping areas to facilitate adjustment of the pins.

A skinning machine that is easy to assemble, clean, and adjust the clamping pressure has been shown and thus all the stated objectives have been met.

What is claimed is:

1. A skinning machine, comprising:
   a skinning blade mounted between a clamp and a shoe;
   the shoe having at least one bore that extends through the shoe and at least one cam arm mounted to a bottom surface of the shoe;
   the clamp having at least one aperture generally in alignment with the bore of the shoe; and
   at least one pin that extends through the aperture and the bore and is retained by the cam arm to provide clamping pressure to hold the blade between the clamp and the shoe.

2. The machine of claim 1 wherein the pin is adjustable.

3. The machine of claim 2 wherein the pin has a first portion and a second portion threadably received within the first portion.

4. The machine of claim 3 wherein the first portion has a base with a diameter greater than a diameter of the aperture of the clamp.

5. The machine of claim 3 wherein the second portion has a retaining head.

6. The machine of claim 3 wherein the second portion has a ridge having a diameter greater than that of a diameter of the aperture of the clamp.

* * * * *